United States Patent
French

(10) Patent No.: US 6,468,008 B2
(45) Date of Patent: Oct. 22, 2002

(54) APPARATUS FOR CONSTRAINING THE POSITION OF LOGS ON A TRUCK OR TRAILER

(75) Inventor: Craig French, Suring, WI (US)

(73) Assignee: Great Lakes Manufacturing, Inc., Suring, WI (US)

( * ) Notice: Subject to any disclaimer, the term of this patent is extended or adjusted under 35 U.S.C. 154(b) by 0 days.

(21) Appl. No.: 09/794,142

(22) Filed: Feb. 28, 2001

(65) Prior Publication Data

US 2001/0006296 A1 Jul. 5, 2001

Related U.S. Application Data

(63) Continuation-in-part of application No. 09/409,667, filed on Sep. 30, 1999, now Pat. No. 6,209,942.

(51) Int. Cl.⁷ ................................................. B60P 7/08
(52) U.S. Cl. ............................. 410/37; 410/32; 410/36; 410/42; 296/43; 280/147
(58) Field of Search .............................. 410/32, 34, 36, 410/37, 42; 296/43; 105/386, 390; 280/143, 147, 404

(56) References Cited

U.S. PATENT DOCUMENTS

| | | | | |
|---|---|---|---|---|
| 1,342,654 A | * | 6/1920 | Torgerson | 410/37 |
| 1,392,343 A | * | 10/1921 | Leishman | 410/37 |
| 1,799,628 A | * | 4/1931 | Knowles | 410/37 |
| 3,458,215 A | * | 7/1969 | Maradyn | 410/37 |
| 3,637,235 A | * | 1/1972 | Karlin et al. | 410/37 |
| 3,977,695 A | | 8/1976 | Hassell | |
| 3,977,717 A | | 8/1976 | Hassell | |
| 4,003,585 A | | 1/1977 | Richards | |
| 4,174,118 A | | 11/1979 | Heyne et al. | |
| 4,268,051 A | | 5/1981 | Skirvin et al. | |
| 4,280,712 A | | 7/1981 | Clark | |
| 4,790,712 A | | 12/1988 | Batson | |
| 5,567,096 A | * | 10/1996 | Howard | 410/42 |
| 5,611,286 A | | 3/1997 | Liermann | |
| 5,730,455 A | * | 3/1998 | Varnum, Sr. et al. | 280/404 X |
| 5,964,557 A | * | 10/1999 | Eng | 410/37 |
| 5,993,126 A | | 11/1999 | Janzen | 410/37 |
| 6,149,360 A | * | 11/2000 | Billotte | 410/37 |
| 6,209,942 B1 | * | 4/2001 | French | 296/43 |

* cited by examiner

Primary Examiner—Stephen T. Gordon
(74) Attorney, Agent, or Firm—Birch, Stewart, Kolasch & Birch, LLP

(57) ABSTRACT

The present invention embodies a method and structure for constraining logs on a truck or trailer without the use of safety wrapper chains or straps. In this apparatus, the stakes, bunks, bunk pockets, head board and tail board are used to constrain logs on the bed of the truck or trailer. The stakes may be permanently or semi-permanently fixed into a bunk pocket and the stakes constrain the movement of the logs from side to side on the truck or trailer. The head board and tail board are permanently attached to stakes which are correspondingly inserted into pockets welded into the bed of the trailer or truck and are permanently or semi-permanently fixed in the pockets. The head board and tail board constrain the movement of the logs from front to back on the truck or trailer. This systems configuration makes it possible for the logs to be hauled without the addition of safety wrapper chains or straps to secure the load. This makes loading quicker and easier and reduces overall vehicle weight and labor overhead.

26 Claims, 9 Drawing Sheets

APPARATUS FOR CONSTRAINING THE POSITION OF LOGS ON A TRUCK OR TRAILER

This application is a Continuation-in-Part of application Ser. No. 09/409,667, filed Sep. 30, 1999, now U.S. Pat. No. 6,209,942, entitled Extruded Bunk Stakes, Bunks And Bunk Pockets For Logging Trucks And Trailers, the entire contents of which are hereby incorporated by reference.

BACKGROUND OF THE INVENTION

1. Field of the Invention

The present invention relates to an apparatus and method for constraining the position of logs on a truck or trailer using permanent fixed stakes, head boards and tail boards, thus eliminating the need for safety wrapper chains.

2. Description of the Background Art

The hauling of logs on trucks or trailers is regulated closely by state and federal regulations to assure safety in the transportation of logs. A typical truck or trailer has fixed or movable stakes that constrain the logs on the truck or trailer. These stakes are placed inside a bunk pocket. The bunk pockets are secured to a bunk which is a member that passes under the truck or trailer bed and supports the bunk pocket into which the stakes are placed. Once the logs are placed on the trailer inside the stakes, a safety wrapper chain or strap is added to further secure the logs to the truck or trailer bed in compliance with transportation regulations. The wrapper chains or straps are necessary to secure the logs and keep them from moving front to back or back to front as the truck or trailer moves.

U.S. Pat. No. 3,977,717 and U.S. Pat. No. 3,977,695 show stakes which are designed to be easily removable. Further the stakes in U.S. Pat. No. 3,977,695 can be latch released to allow logs to roll off a truck or trailer.

U.S. Pat. No. 5,611,286 show stakes which are designed specifically to be automatically extended.

U.S. Pat. No. 4,174,118 describes a pivoting bunk mounted on a plastic disc. This design focuses on bunks that pivot or rotate to accommodate the turns that may be made as a truck or trailer rounds a corner.

U.S. Pat. No. 4,268,051 shows bunks and stakes which are not fixed elements. The stakes have roller inserts which can be welded into a cross frame of a log trailer to provide low friction to a pivoted log bunk.

U.S. Pat. No. 4,003,585 details a cable and spooling device that holds up or supports bunk stakes and can be released with a trip lever and the cable is then spooled into a storage area.

U.S. Pat. No. 4,280,712 details an articulation system for trucks and trailers which allows the truck and trailer to pivot in the center.

U.S. Pat. No. 4,790,712 details a carriage system that is not part of a truck or trailer. The carriage or apparatus is first loaded, then a truck is backed under the load and the load is released to the bed of the truck.

U.S. Pat. No. 5,993,126 also details a pivoting bunk with stakes so that long loads can follow the trailer when the vehicle rounds corners.

There is a need in the art for a system which makes it possible for logs to be hauled without the addition of safety wrapper chains or straps to secure the load.

SUMMARY OF THE INVENTION

The present invention fulfills the aforementioned need in the art by providing a system configuration for constraining logs to be hauled on a truck or trailer without the use of safety wrapper chains or straps to secure the load. Stakes, bunks, bunk pockets, a head board and a tail board are used to constrain logs on the bed of the truck or trailer.

The stakes in the present invention constrain the logs movement from side to side on the truck or trailer. The stakes are made of lightweight hardened aluminum and are formed using an extrusion process that produces an internal web member that adds additional strength. The stakes are designed to be fixed in a bunk pocket and are not typically removed when the logs are unloaded. The stakes in the present invention are not automatically extendible.

The bunks in the present invention are fixed in position and do not contain roller inserts, and do not move in any way as they are welded into the frame of the truck or trailer bed. In this invention, the bunks and the bunk pockets are assembled from a series of steel or other ferrous or nonferrous materials and are welded together. In this novel system configuration, the stakes and bunks are fixed parts of the trailer and therefore do not need to move as the truck rounds corners.

The head board and tail board constrain the logs movement from front to back on the truck or trailer. The head board and tail board are permanently attached to stakes which are correspondingly inserted into pockets welded into the bed of the trailer or truck and may be permanently fixed in the pockets. The head board and the tail board are comprised of a series of horizontal and vertical members surrounded by an exterior frame and are also made of lightweight hardened aluminum or other lightweight composite materials. Anti-wear plastic or other anti-wear materials or compositions are placed between aluminum and steel members to avoid excessive wear on the aluminum or other ferrous or nonferrous stakes. The head board, tail board and stakes, being made of lightweight aluminum or other ferrous or nonferrous materials, reduce overall vehicle weight, thereby increasing the weight of the load that can be carried.

The use of cables to support bunk stakes is unnecessary in this invention due to the materials and method of securing them to the bunk.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
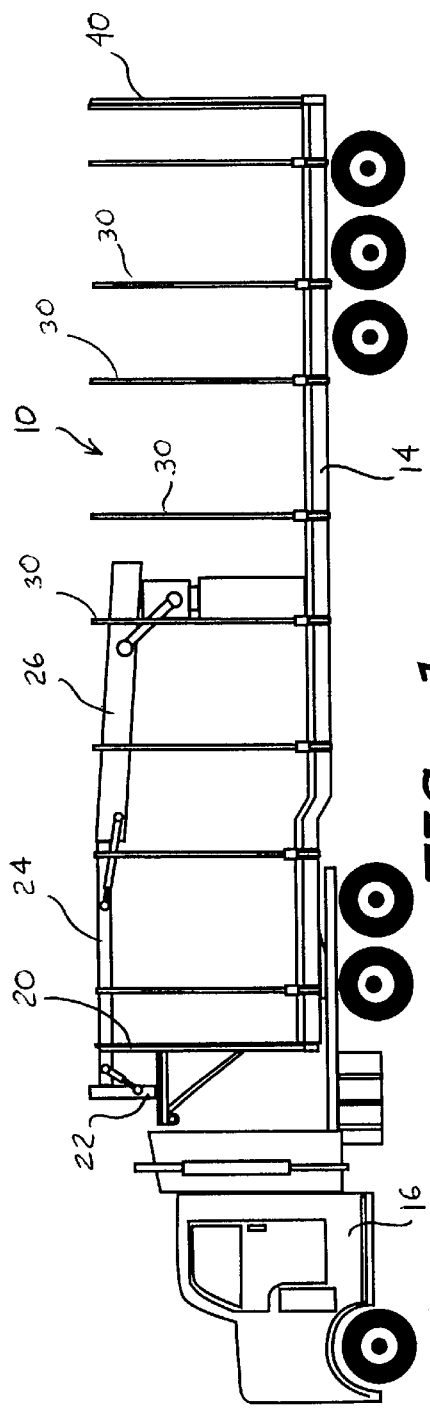
FIG. 1 illustrates an unloaded semi-tractor and trailer.
Figure 2:
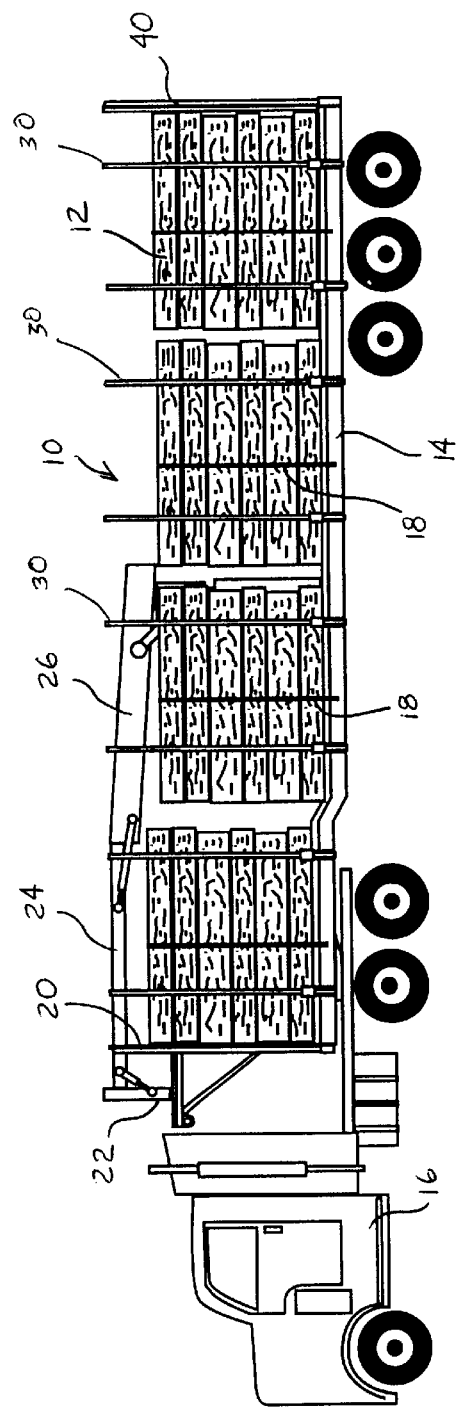
FIG. 2 illustrates a loaded semi-tractor and trailer.

Referring in detail to the drawings, and with particular reference to FIGS. 1 and 2, an apparatus 10 for constraining the position of logs 12 on a trailer 14 is shown. FIG. 1 illustrates an unloaded semi-tractor 16 and trailer 14, and FIG. 2 illustrates a loaded semi-tractor 16 and trailer 14.

The forward end of the trailer 14 includes a head board 20 which prevents undesirable forward movement of the logs 12 during transport. The head board 20 supports a grapple 22 used to load and unload logs 12 onto and off of the trailer 14. The grapple 22 includes an upper boom section 24 pivotally connected to a lower boom section 26, which is rotatably mounted to the trailer 14.

A plurality of extruded aluminum stakes 30 extend along both sides of the trailer 14 and prevent lateral shifting of the logs 12. The stakes 30 are arranged in steel bunk pockets 32 which are located at opposite ends of a bunk 34 (see FIG. 3) extending laterally across the bed of the trailer 14.

The rearward end of the trailer 14 includes a tail board 40 which prevents undesirable rearward movement of the logs 12 during transport. Together, the head board 20, stakes 30, and tail board 40 prevent the logs 12 from shifting off of the front, sides, and rear of the trailer 14 without the use of safety wrapper chains or straps 18 extending over the logs.

A plurality of optional safety wrapper straps or chains 18 are visible on the loaded truck in FIG. 2, but such straps or chains 18 are not necessary. They are merely shown to illustrate where they would be if there were no head board 20 or tail board 40.

A description of the preferred stake 30, bunk 34, bunk pocket 32, head board 20, and tail board 40 follows. However, it is to be understood that the present invention is not limited to the preferred materials, structural configurations or dimensions as described herein, and that these aspects can be changed or modified without departing from the scope of this invention.

Figure 3:
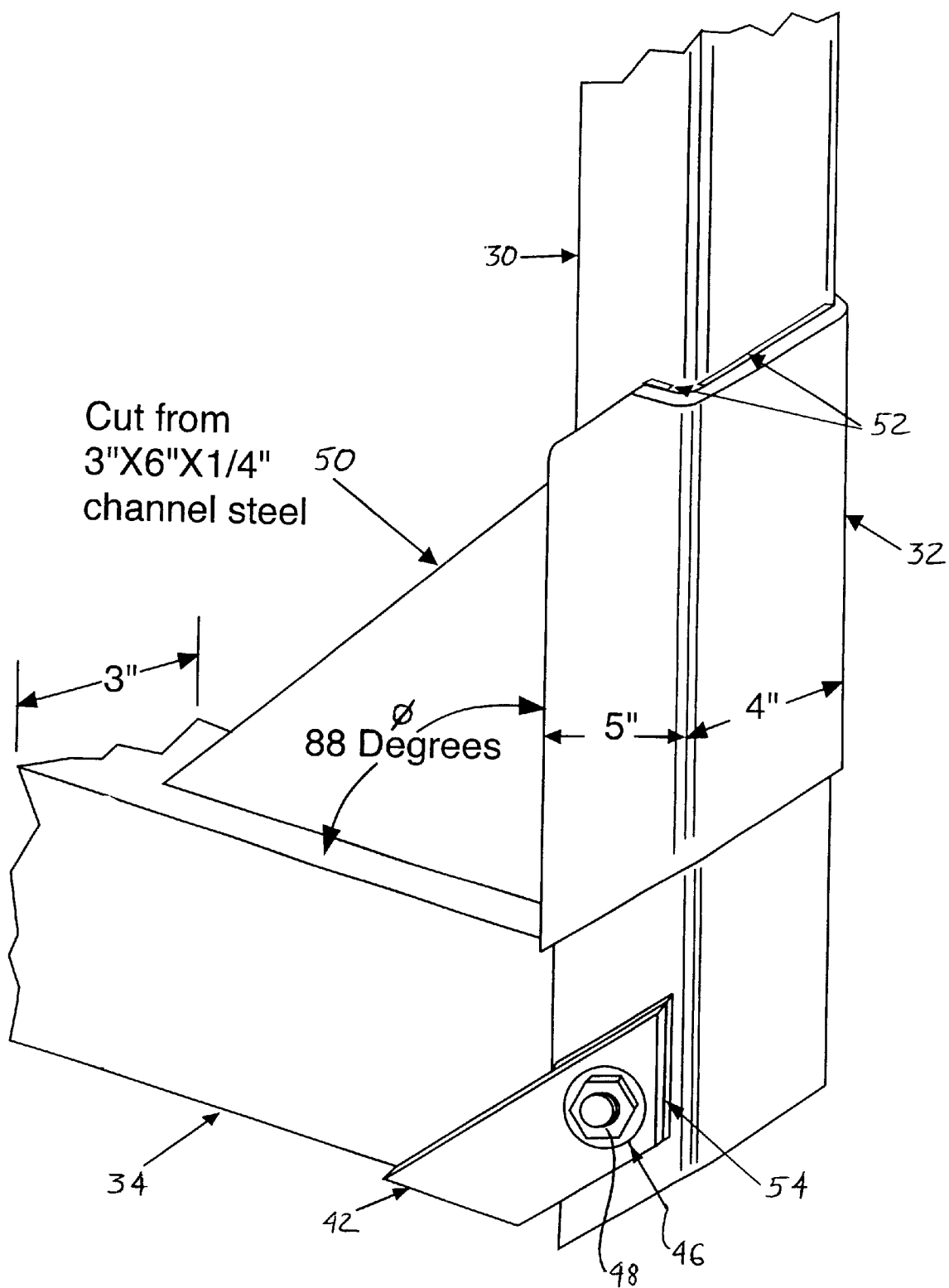
FIG. 3 is a partial isometric view of a bunk, a bunk pocket, and a stake of the present invention.
Figure 4:
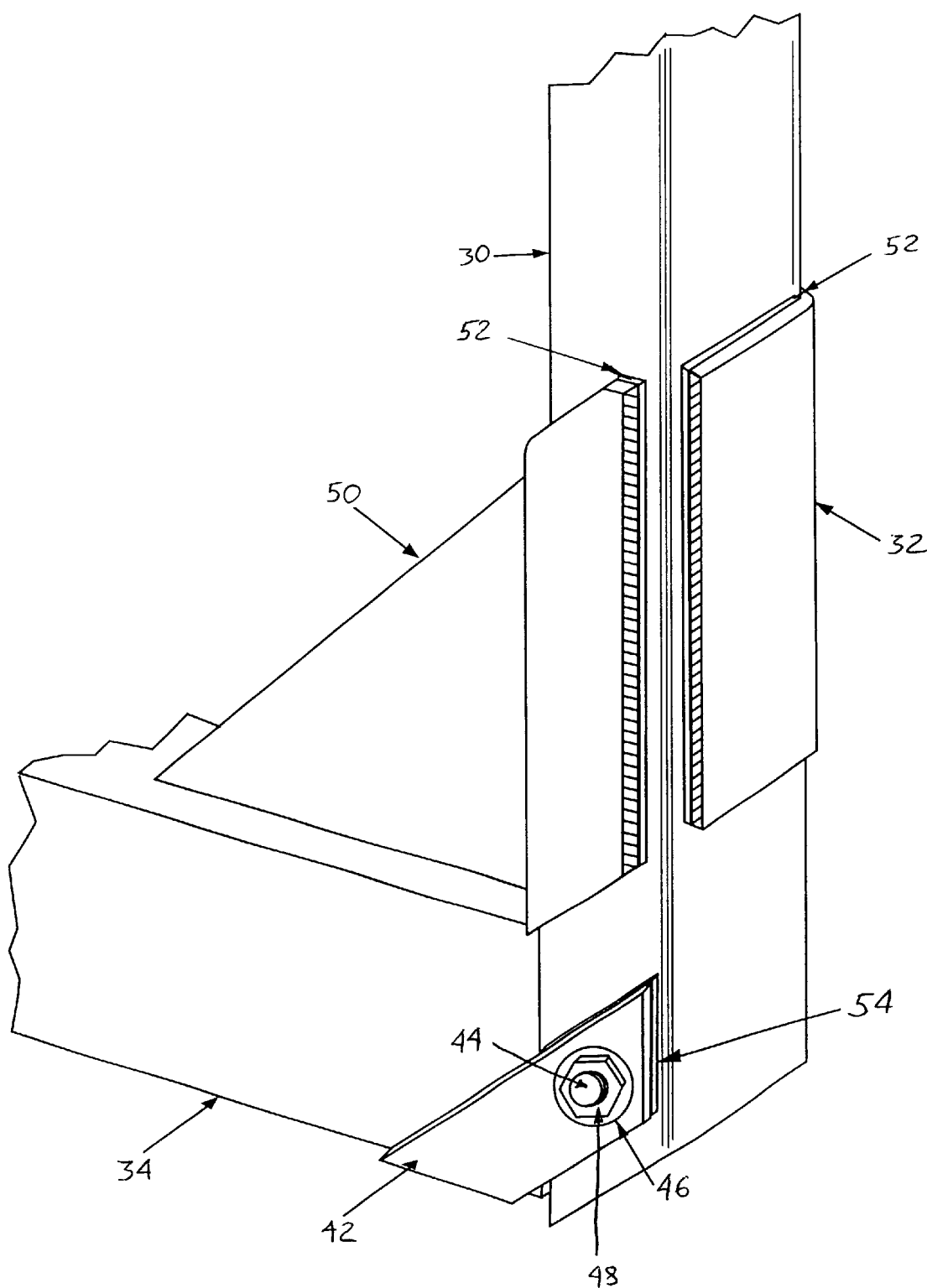
FIG. 4 is a partial isometric view of the bunk, bunk pocket and stake of the present invention, with the bunk pocket shown partially cut away.
Figure 5:
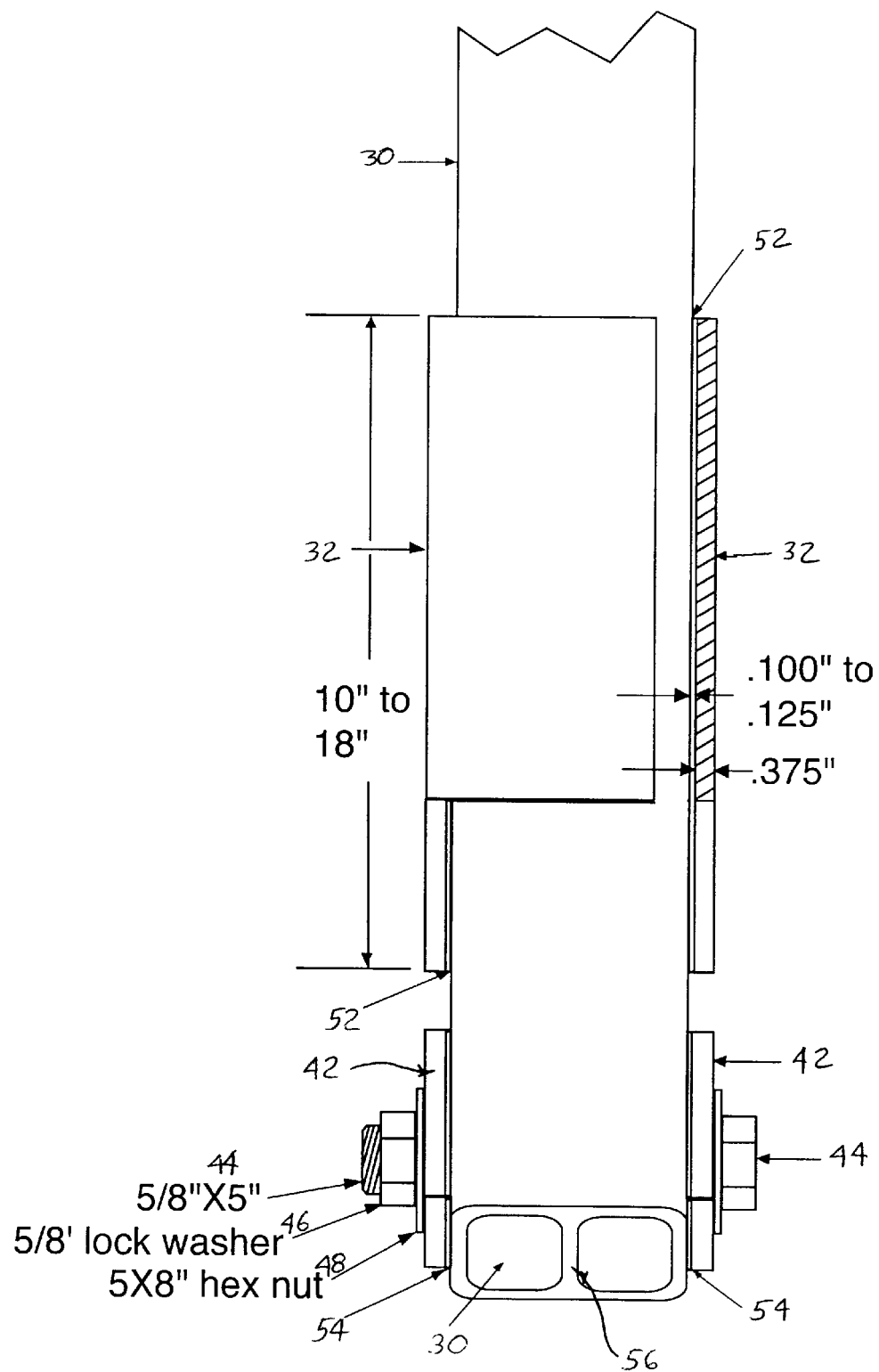
FIG. 5 is a front view of the stake secured in the bunk pocket, with the bunk pocket shown partially cut away.

FIGS. 3–5 illustrate a portion of a bunk 34, a steel bunk pocket 32 located at the end of the bunk 34, and an extruded aluminum stake 30 located in the bunk pocket 32. In the preferred embodiment, each bunk 34 is constructed from rectangular tubular steel, and is 3"×6"×0.375". However, it should be understood that the bunk 34 is not limited to these dimensions, structural configuration or materials. The length of the bunk 34 depends on the width of the truck or trailer 14.

The bunks 34 are typically attached under or on top of a trailer 14 or truck frame in multiples and are perpendicular to the length of the truck or trailer 14. The steel bunks 34 meet or exceed the transportation regulations for strength. The bunks 34 serve as a support member for the bunk pocket 32 and the stake 30 which is placed inside the bunk pocket 32.

A stake retaining plate 42 is welded to the end of the bunk 34, and is used to secure the stake 30 in the bunk pocket 32. A bolt 44 is then inserted through both the stake retaining plate 42 and the stake 30, and is secured with a washer 46 and a nut 48. Other suitable fasteners may also be used, such as pins, clips, etc.

Once the stakes 30 are placed inside the bunk pocket 32, the retaining bolt 44 is placed through the stake retaining plate 42 and the stake 30 to secure the stake 30 in position. The retaining bolt 44 is subsequently secured with the washer 46 and the locking hex nut 48. Preferably, the retaining bolt 44, washer 46 and nut 48 are ⅝", and the retaining bolt 44 is 5" in length, although other suitable sizes may be utilized. Although not shown in the drawings, the lower end of the bunk pocket 32 may include a bottom wall, a bottom lip extending around all or part of the inner perimeter of the bunk pocket, or some other stop member attached thereto in order to prevent the stake 30 from sliding downwardly through the bunk pocket 32.

In the preferred embodiment, each bunk pocket 32 is constructed from rectangular tubular steel, and the overall dimensions are 4"×5"×0.375". The length of the bunk pocket 32 is 8" to 18" depending on the particular application. However, it should be understood that the bunk pocket 32 is not limited to these dimensions, structural configuration or materials. The bunk pocket is cut at a 45 degrees angle on the top and bottom.

The bunk pocket 32 is welded to a support gusset 50, which is correspondingly welded to the bunk 34. The support gusset 50 is preferably cut from 3"×6"×¼" wall steel structural tube material, although other sizes and shapes may be used. The tube material is cut at approximately a 44 degree angle at each end so that the support gusset 50 has three side walls. Two of the side walls have a triangular shape and are located opposite to one another, and the remaining one of the side walls is rectangular and interconnects the two triangular shaped walls. Only one triangular side wall of the support gusset 50 is shown in FIG. 4, and is shown slightly recessed from the bunk 34. However, the support gusset 50 may also be configured flush with the bunk 34.

The support gusset 50, being cut on the ends at an angle, forms an angle Ø of 88 degrees between the bunk 34 and the bunk pocket 32. However, it should be understood that the angle is not limited to 88 degrees. The angle cuts on the ends of the support gusset 50 causes the stakes 30 to angle inwardly toward the center of the truck or trailer 14 to offset the load that will be placed against the stake 30 when the trailer 14 is loaded.

FIG. 4 illustrates the steel bunk pocket 32, a portion of which has been cut away revealing an anti-wear plastic insert 52 located between the extruded aluminum stake 30 and the steel bunk pocket 32. The insert 52 may preferably be 0.100" to 0.125" in thickness. Another anti-wear plastic insert 54 is arranged between the steel stake retaining plate 42 and the extruded aluminum stake 30. This prevents wear on the ends of the stakes 30 which are made of extruded hardened aluminum. The anti-wear plastic inserts 52, 54 are preferably attached to the bunk pocket 32 and the stake retaining plate 42, although it is conceivable to instead cover the lower end of the stake 30 with anti-wear material.

FIG. 5 illustrates a view of the extruded aluminum stake 30 secured in a steel bunk pocket 32, which is partially cut away to reveal the anti-wear plastic insert 52. Also seen in this view are the steel stake retaining plate 42, the stake retaining bolt 44 with washer 46, and the corresponding nut 48 and washer 46. The bottom of the extruded aluminum stake 30 is visible showing the hollow portions of the stake 30 and a centrally located web 56.

Figure 6:
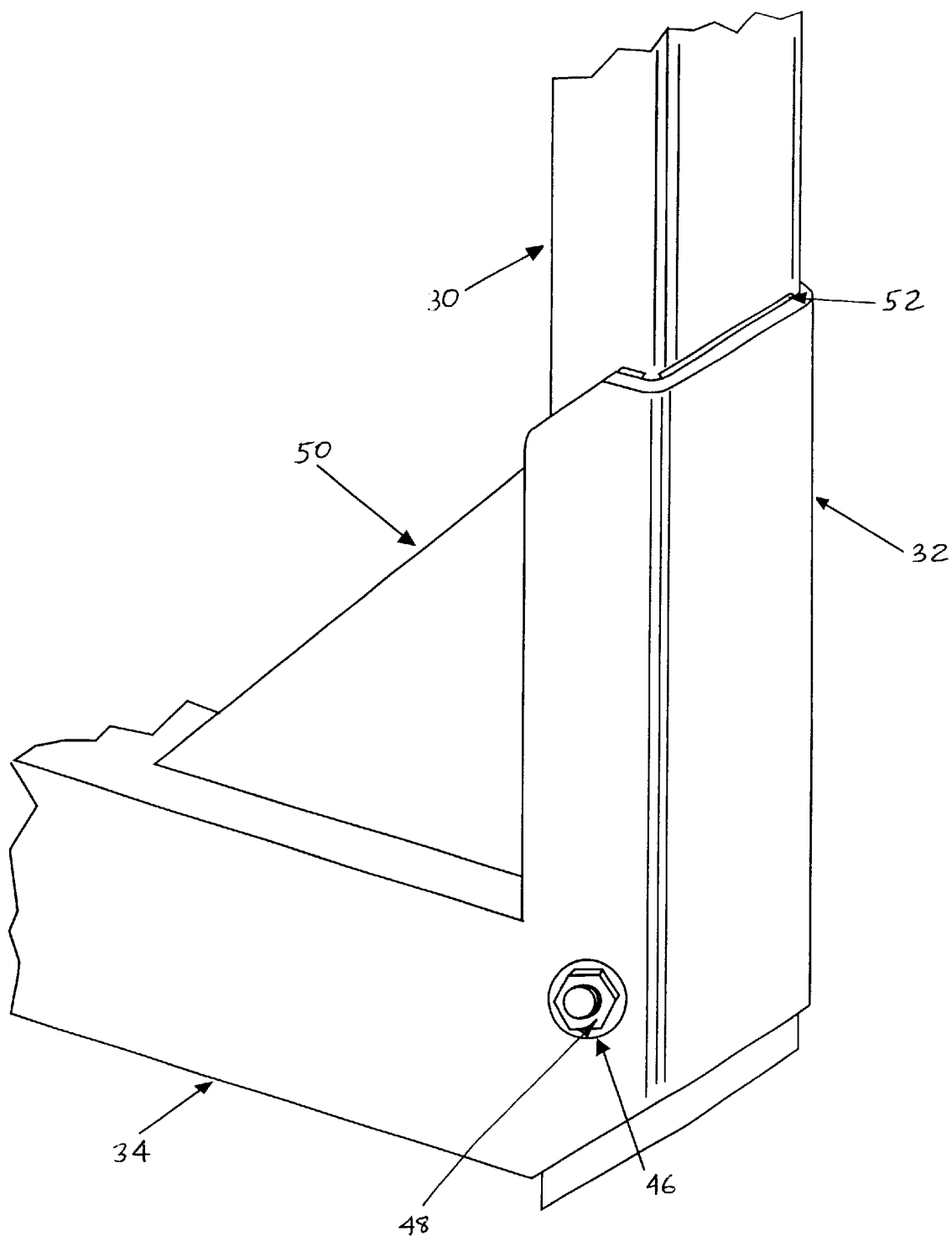
FIG. 6 is a partial isometric view of a second embodiment of a bunk, bunk pocket, and stake of the present invention.

FIG. 6 illustrates a second embodiment of a bunk 34, a steel bunk pocket 32, and an extruded aluminum stake 30. The steel bunk pocket 32 is integrally formed with or secured to the steel bunk 34, and a steel gusset 50 interconnects a side wall of the bunk pocket 32 to the bunk 34. The extruded aluminum stake 30 is secured in place with a bolt 44, washers 46 and a nut 48. To reduce wear, an anti-wear plastic insert 52 has been inserted between the steel bunk pocket 32 and the extruded aluminum stake 30.

Figure 7:
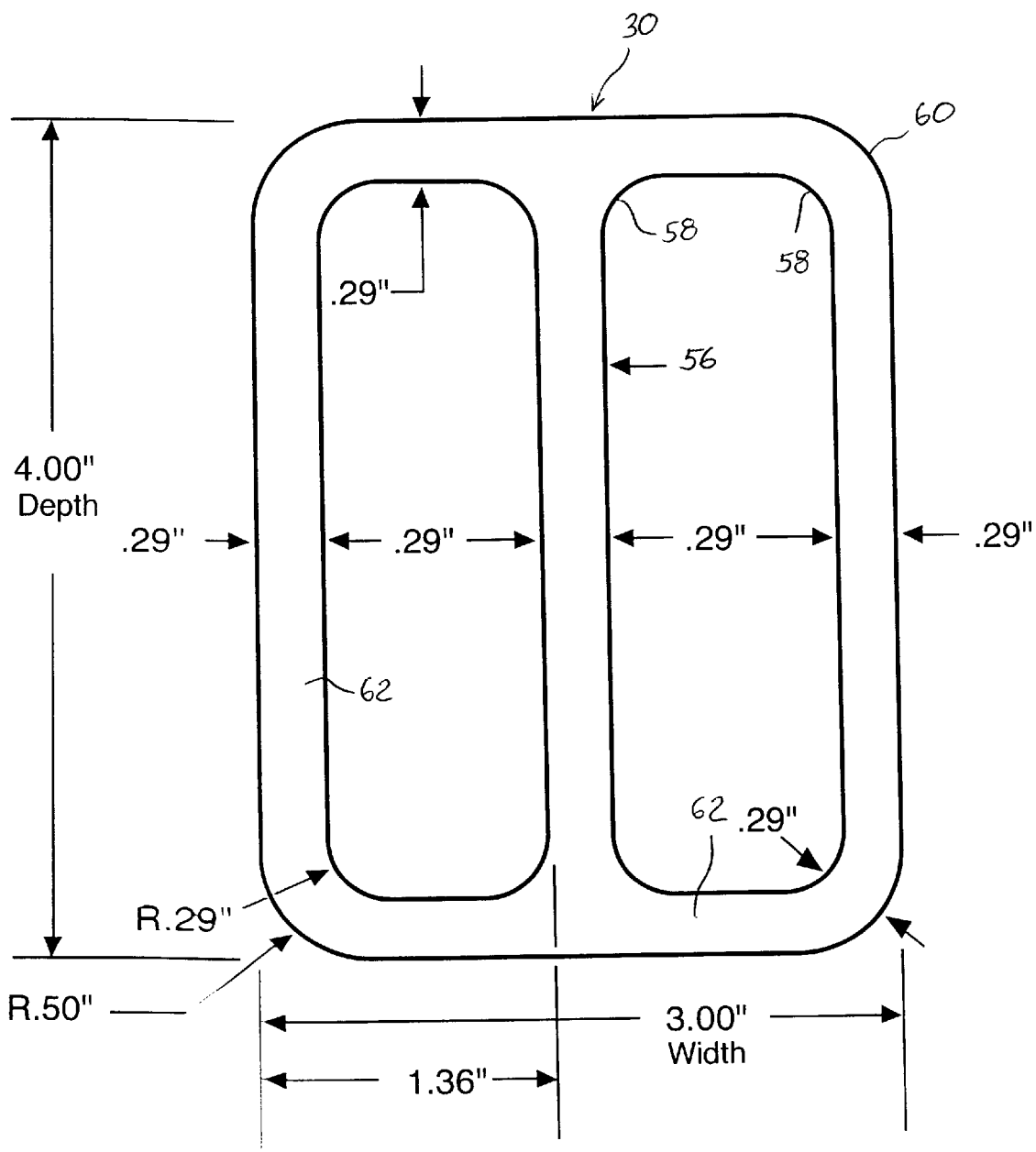
FIG. 7 is an end view of a stake according to the present invention.

FIG. 7 illustrates an end view of the extruded aluminum stake 30. The stake 30 includes an internal web 56 traversing the interior of the stake 30 from front to back which, along with radiused corners 58, 60, adds significant strength to the stake 30. The thickness of the walls 62 is 0.29", and the thickness of the web 56 is 0.29". The overall width of the stake 30 is 3", and the overall depth is 4". The radiuses of the inside corners 58 are 0.29", and the radiuses of the outside corners are 0.50". It should be understood that the stake 30 is not limited to the preferred materials, structural configurations or dimensions, and can be changed or modified without departing from the scope of this invention.

The stake 30 is preferably manufactured using an extrusion method from aluminum or other lightweight metals or materials. The lightweight materials of the stakes 30 makes the overall vehicle weight less and thus allows for a greater load capacity. The web 56 is formed during the extrusion process, and extends the complete length of the interior of the extruded stake 30. The extruded stake 30 is vertically positionable in a bunk pocket 32. The stakes 30 are fixed in the steel bunk pockets 32 by the bolt 44 as discussed above. However, the stakes 30 may also be permanently secured into the bunk pockets 32 by welding or other permanent securing methods.

An analysis was performed by comparing the relative strength of current steel stakes to that of their aluminum counterparts. A test load was developed using the known maximum payload of a trailer 14, approximately 70,000 pounds. The current stakes are made from a 50,000-psi yield strength material. The design is stable and very few failures were seen. Thus, if an aluminum stake 30 could be made to be as strong as steel, it too should show similar stability under the 70,000 pound load.

A first test was performed to determine the tensile strength. The stakes 30 and bunks 34 were modeled together for a realistic stress test. A load of 4,000 pounds was applied to the top side of the bunk 34. The load was derived by using 70,000 pound payload divided by the eight bunks 34 that would be on the trailer 14. This number was then divided into uniform loads that would sit above the frame rail and on each side of the frame rails. The model is only of the bunk 34 from the inside of the frame rail to the outside of the trailer 14. A 1,500 pound load was applied to the inside face of the stake 30. This load simulates the force of the logs 12 wanting to roll off the pile and exerting force against the stake 30. This load also simulates the force of the loader pushing the logs 12 down to situate them.

A second test was performed to determine the endurance. The stakes 30 and bunks 34 were put through a test consisting of 500,000,000 high stress loading cycles. This exceeds the normal number of stress cycles in the usual life of a stake 30 and a bunk 34. The normal number of stress cycles in the life of a bunk 34 and stake 30 is 3,120,000 cycles. The following chart illustrates the calculations used to determine the number of stress cycles in the life of a bunk 34 and stake 30:

| Operation | No. of Stress Cycles | Times Per Day |
|---|---|---|
| Loading | 40 | 4 |
| Hauling | 20 | 4 |
| Unloading | 40 | 4 |

Total per day=400
Total per week (6-day work week)=2400
Total per year (52 weeks per year)=124,800
Total per life (25 years)=3,120,000

The number of high stress cycles are less than 500 million in the lifetime of this invention, and the minimum yield strength is higher than 20,000 psi. The force applied to an element, divided by the area to which the force is applied is known as stress. For example, if a 10" by 10" square column carries a 120,000 pound load, it's stress is calculated by dividing 120,000 by 100, which equals 1,200 pounds per square inch, abbreviated 1,200 psi.

The results of the load carrying tests reveal that the aluminum design is twenty-five percent stronger than the steel design. The 6061-T6 aluminum used in the second test has a yield strength of approximately 40,000 psi compared to steels rated 50,000 psi, which makes the aluminum twenty percent weaker than the steel counterpart. Although weaker than the steel in psi, the aluminum well exceeds the federal regulations on stakes. Stress plots generated revealed that the aluminum extrusion stakes 30 of this invention show stress levels lower than that of steel stakes. The steel has the initial advantage in terms of ultimate tensile strength (psi), but this invention has a fifty-four percent lower stress level, and it is twice as strong as a steel stake.

Radiused corners 58, 60 must carry their own weight plus the pressure of a load placed within the confines of the trailer 14 or truck. Because of the arch action of horizontal curvatures, the pressure of loads against the face of the stakes 30 is channeled to the sides of the stake 30 that are perpendicular to the load, and ultimately to the bunk 34 and bunk pocket 32, into which the stake 30 is secured. Loads accumulate along vertical medians, and they become more and more compressed as they approach the radiused corners 58,60. As in the construction of arches, radiused corners 58, 60 provide additional strength. This invention complies with the configuration of a monolithic structure, allowing for the reduction in the wall thickness of the extruded stake 30, as loads, and the force of the load is distributed more evenly to the sides of the stake 30.

The continuity of radiused corners 58, 60 allows such reduction of thickness by introducing actions along horizontal sections or parallels that prevent the sides of the stake 30 from being distorted. The parallels or walls of the stake 30 behave like the curvatures of an arch. Further, the additional member or centrally located web 56 allows the stake 30 to twist as a result of load stress to a greater extent, without failure of the stakes structural integrity. The centrally located web member 56 adds additional strength and rigidity to the stake 30.

It is to be understood the invention is not limited to the numerical, material, or structural configurations in the descriptions in the above embodiment. Further, the elements, stake 30, bunk 34, and bunk pockets 32 can be used individually or in combination with one another, and with stakes 30, bunks 34 and bunk pockets 32 made from different materials. The stakes 30, bunks 34 and bunk pockets 32 may be formed as disclosed herein, or as disclosed in co-pending application Ser. No. 09/409,667, filed Sep. 30, 1999, the entire contents of which are hereby incorporated by reference.

Figure 8:
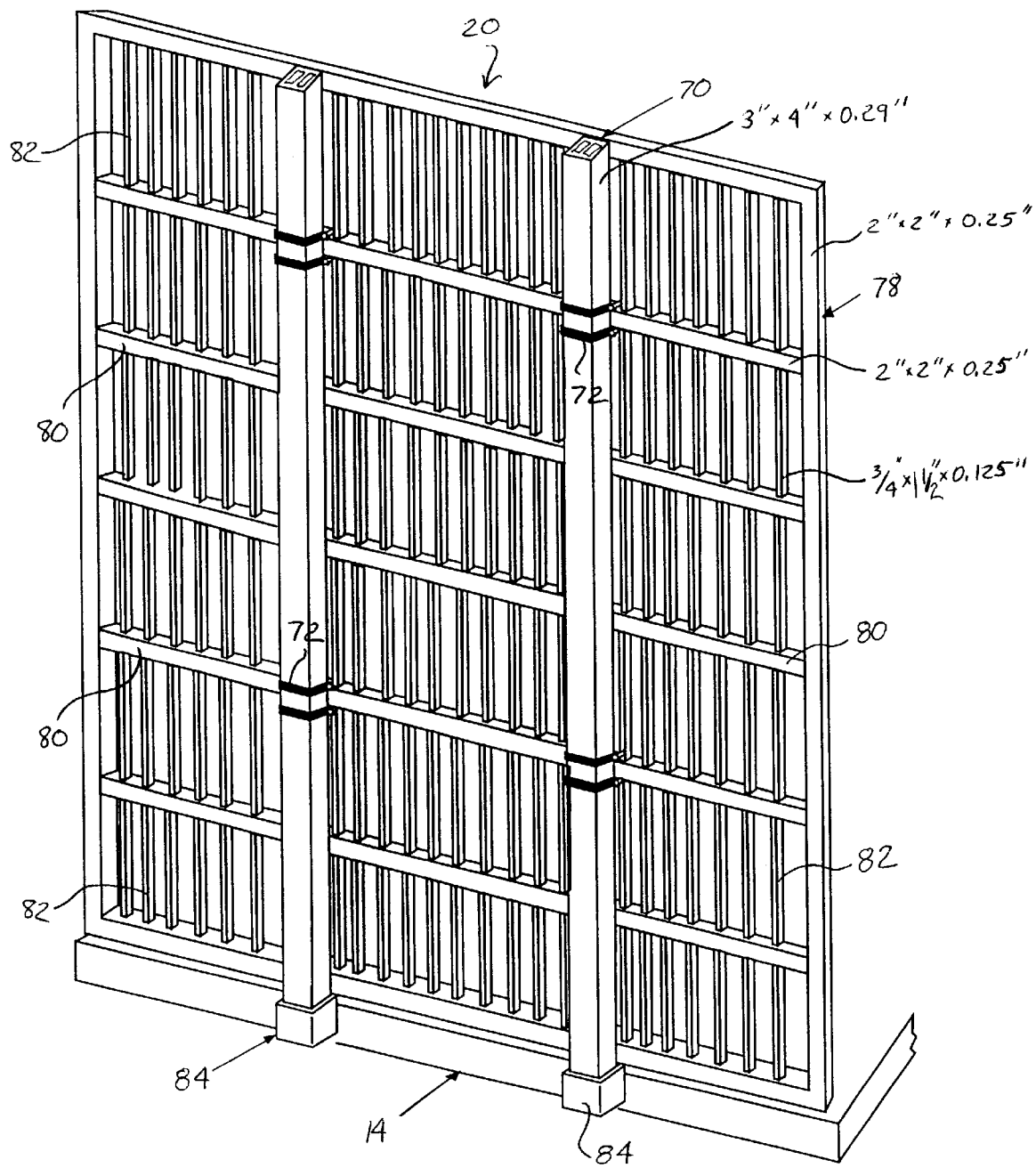
FIG. 8 is a front view of a first embodiment of a head board without a notch for the loading boom.

FIG. 8 illustrates a first embodiment of a head board 20. The head board 20 is secured to two extruded aluminum stakes 70 using eight U-bolts 72 and eight corresponding plates 74. The plates 74 are secured to the U-bolts 72 with nuts 76. This type of head board 20 is employed on trailers 14 or trucks which do not have their own internal loading equipment and are thus loaded from the outside. Alternatively, the stakes 70 may be welded to the head board 20 as opposed to being attached with U-bolts 72 and plates 74.

Although not limited to particular dimensions, structural configuration or materials, the preferred embodiment of the head board 20 is 7 to 9 feet wide and 4 to 10 feet tall depending on the truck or trailer 14. The tubular material comprising the outer frame 78 is 2"×2"×0.250". The aluminum tubing used to construct the horizontal frame members 80 is 2"×2"×0.250", and the aluminum tubing used to construct interior vertical members 82 is ¾"×1½"×0.125". The head board 20 is secured to two vertical stakes 70 using U-bolts 72 and plates 74 as described above, and the stakes 70 are inserted into the steel pockets 84. An anti-wear plastic material may be placed between the aluminum stakes 70 and the steel pockets 84.

Figure 9:
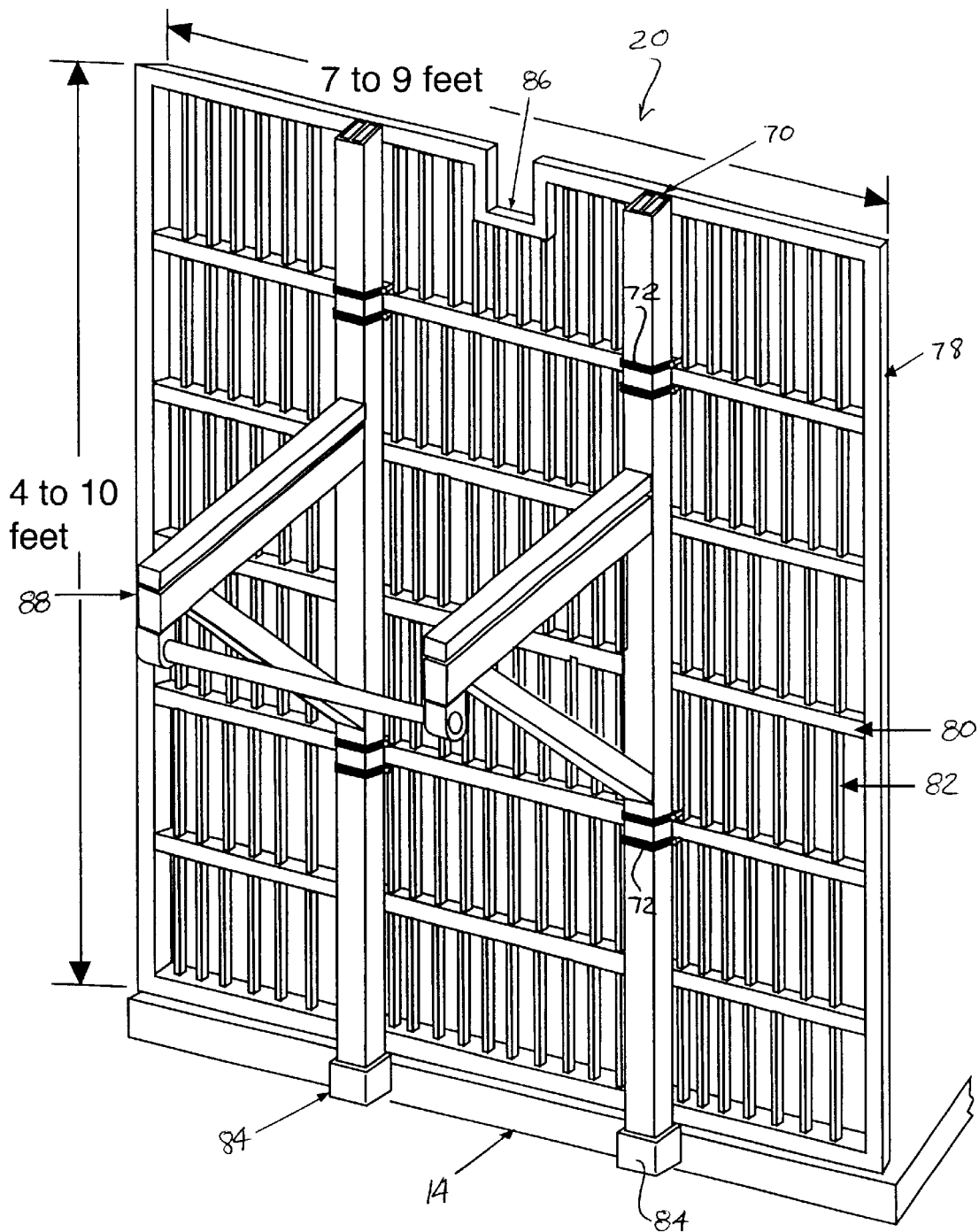
FIG. 9 is a front view of a second embodiment of a head board of the present invention having a notch for a loading boom fabricated into the frame.

In situations where the truck or trailer 14 has a loading mechanism, the head board 20 may have a notch 86 formed into the upper edge of the frame 78 to accommodate the upper boom section 24 of the loading mechanism. FIG. 9 illustrates a second embodiment of a head board 20 having a notch 86 fabricated into the frame 78 for receiving and supporting the loading boom. To support the grapple 22, an aluminum support frame 88 has been added to the head board 20 to provide a grapple support rack fabricated on the tractor side of the head board 20. The head board 20 restrains the logs 12 and keeps them from moving forward during transport. Further, the lightweight materials of the head board 20 make the overall vehicle weight less and thus allows for a greater load capacity.

Figure 10:
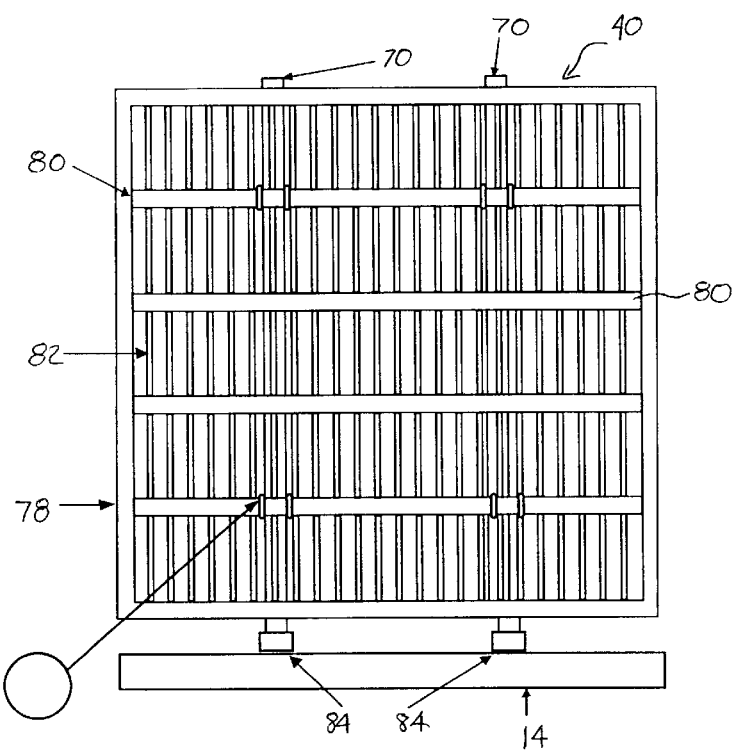
FIG. 10 is a front view of a tail board of the present invention.
Figure 11:
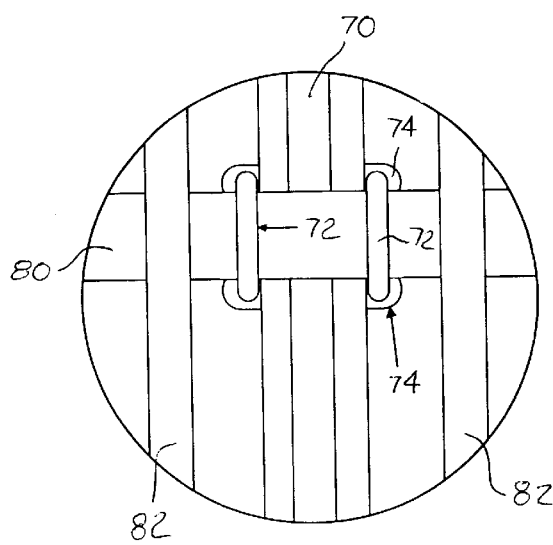
FIG. 11 is an enlarged front view of a portion of the tail board showing the connection.
Figure 12:
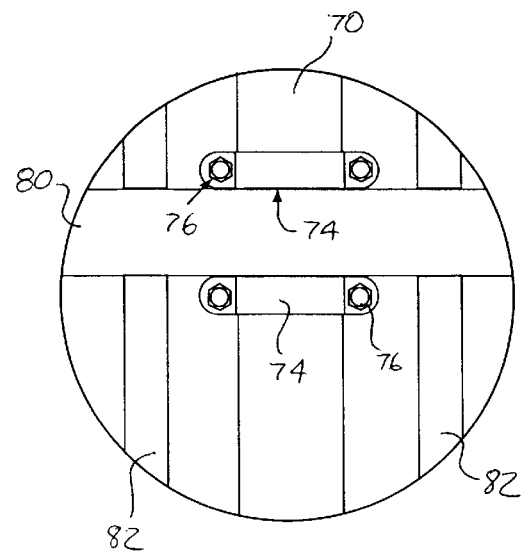
FIG. 12 is an enlarged rear view of a portion of the tail board showing the connection.

FIGS. 10–12 illustrate a tail board 40 of the present invention. In the preferred embodiment, the tail board 40 is 7 to 9 feet wide and 4 to 10 feet tall depending on the truck or trailer. The tail board 40 is constructed of horizontal members 80 and vertical members 82 constrained by an outer frame 78. The tail board 40 is constructed from rectangular aluminum tubing. The aluminum tubular material used to construct the outer frame 78 is 2"×2"×0.250". The aluminum tubular material used to construct the horizontal frame members 80 is 2"×2"×0.250". The aluminum tubular material used to construct the interior vertical members 82 is ¾"×1½"×0.125". The lightweight materials of the tail board 40 makes the overall vehicle weight less and thus allows for a greater load capacity. These materials and dimensions given are one example, and the present invention is not limited to these dimensions, structural configuration or materials.

The tail board 40 is secured to two vertical extruded aluminum stakes 70 using eight U-bolts 72 and corresponding plates 74, similarly to the method used to secure the head board 20 to the stakes 70. The plates 74 are secured to the U-bolts 72 with nuts 76. The stakes 70 are then secured into pockets 84 located at the rear of the truck or trailer 14 which are a steel welded component of the truck or trailer. An anti-wear plastic material may be placed between the aluminum stakes 70 and the pockets 84. The tail board 40 restrains the logs 12 and keeps them from moving backward during transport.

Since the head board 20 constrains logs 12 from moving forward, the tail board 40 constrains the logs 12 from moving backward, and the stakes 30 constrain the logs 12 from moving side to side, the logs 12 are immobilized, thus eliminating the need for safety wrapper chains 18 and reducing loading time and overall weight. However, the present invention may be used with safety wrapper chains or straps if desired or required in a particular jurisdiction.

The entire contents of each of the U.S. Patents listed and discussed in this application are incorporated herein by reference.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for constraining a load comprising:
   a bunk;
   a bunk pocket supported by said bunk; and
   a stake vertically positionable in said bunk pocket, said bunk pocket comprising:
      a plurality of side walls surrounding said stake;
      a gusset interconnecting one of said side walls to said bunk;
      one of said bunk and said bunk pocket including a stake retaining portion; and
      a fastener interconnecting said stake retaining portion to said stake to thereby secure said stake in said bunk pocket; and
   said stake comprising a main body having a centrally located supporting web integrally formed therein traversing the depth of said stake, said web being positioned perpendicular to a load that said stake will constrain.

2. The apparatus for constraining a load according to claim 1, wherein said bunk pocket is bottomless such that said stake is freely slidable through the bunk pocket, and said fastener prevents said stake from sliding through said bunk pocket.

3. The apparatus for constraining a load according to claim 1, wherein said bunk pocket includes an anti-wear insert therein to prevent wear of said stake positioned within said bunk pocket.

4. The apparatus for constraining a load according to claim 1, wherein said gusset has first and second side edges oriented at approximately 88 degrees with respect to one another, said first edge being fixed to said bunk, and said second edge being fixed to said bunk pocket, whereby said bunk pocket is oriented at approximately 88 degrees with respect to said bunk.

5. An apparatus for constraining a load comprising:
   a bunk;
   a bunk pocket supported by said bunk; and
   a stake vertically positionable in said bunk pocket, said bunk pocket comprising:
      a plurality of side walls surrounding said stake;
      a gusset interconnecting one of said side walls to said bunk;

one of said bunk and said bunk pocket including a stake retaining portion; and a fastener interconnecting said stake retaining portion to said stake to thereby secure said stake in said bunk pocket, wherein upper and lower faces of said bunk pocket are slanted downwardly proceeding in a direction toward said bunk.

6. An apparatus for constraining a load comprising:

a bunk;

a bunk pocket supported by said bunk; and a stake vertically positionable in said bunk pocket, said bunk pocket comprising a plurality of side walls surrounding said stake, wherein said stake comprises a main body having a centrally located supported web integrally formed therein traversing a depth of said stake, and web being positioned perpendicular to a load that said stake will constrain.

7. The apparatus for constraining a load according to claim 6, wherein said stake includes internally and externally radiused corners which add to the structural integrity of said stake, said radiused corners of said stake, on the outside corners, internally and externally, and internally adjacent to said centrally located web, transferring the pressure of the load constrained by said stakes to said centrally located web and to side walls of said main body parallel to said web.

8. The apparatus for constraining a load according to claim 1, wherein said stake retaining portion comprises a stake retaining plate secured to said bunk.

9. An apparatus for constraining a load comprising:

a bunk;

a bunk pocket supported by said bunk; and a stake vertically positionable in said bunk pocket, said bunk pocket comprising:

a plurality of side walls surrounding said stake;

a gusset interconnecting one of said side walls to said bunk;

one of said bunk and said bunk pocket including a stake retaining plate secured to said bunk; and a fastener interconnecting said stake retaining plate to said stake to thereby secure said stake in said bunk pocket, wherein said stake includes an aperture extending therethrough, said stake retaining plate includes an aperture extending therethrough, and said fastener passes through said aperture in said stake and said aperture in said stake retaining plate.

10. The apparatus for constraining a load according to claim 8, wherein said stake retaining plate includes an anti-wear insert therein to prevent wear of said stake positioned thereagainst.

11. The apparatus for constraining a load according to claim 1, wherein said stake retaining portion comprises a lower portion of said bunk pocket.

12. The apparatus for constraining a load according to claim 11, wherein said stake includes an aperture extending therethrough, said bunk pocket includes an aperture extending therethrough, and said fastener passes through said aperture in said stake and said aperture in said bunk pocket.

13. The apparatus for constraining a load according to claim 1, wherein said bunk pocket is integrally formed with said bunk as a one-piece unitary member.

14. The apparatus for constraining a load according to claim 1, wherein said web extends the complete length of the interior of said stake.

15. The apparatus for constraining a load according to claim 6, wherein said web extends the complete length of the interior of said stake.

16. The apparatus for constraining a load according to claim 6, wherein said stake is made of extruded hardened aluminum.

17. The apparatus for constraining a load according to claim 6, wherein one of said bunk and said bunk pocket includes a stake retaining portion, and further comprising a fastener interconnecting said stake retaining portion to said stake to thereby secure said stake in said bunk pocket.

18. The apparatus for constraining a load according to claim 17, wherein said bunk pocket is bottomless such that said stake is freely slidable through the bunk pocket, and said fastener prevents said stake from sliding through said bunk pocket.

19. The apparatus for constraining a load according to claim 17, wherein said stake retaining portion comprises a stake retaining plate secured to said bunk.

20. The apparatus for constraining a load according to claim 19, wherein said stake retaining plate includes an anti-wear insert therein to prevent wear of said stake positioned thereagainst.

21. The apparatus for constraining a load according to claim 17, wherein said stake retaining portion comprises a lower portion of said bunk pocket.

22. The apparatus for constraining a load according to claim 21, wherein said stake includes an aperture extending therethrough, said bunk pocket includes an aperture extending therethrough, and said fastener passes through said aperture in said stake and said aperture in said bunk pocket.

23. The apparatus for constraining a load according to claim 6, wherein said bunk pocket further comprises:

a gusset interconnecting one of said side walls to said bunk.

24. The apparatus for constraining a load according to claim 23, wherein said gusset has first and second side edges oriented at approximately 88 degrees with respect to one another, said first edge being fixed to said bunk, and said second edge being fixed to said bunk pocket, whereby said bunk pocket is oriented at approximately 88 degrees with respect to said bunk.

25. The apparatus for constraining a load according to claim 6, wherein said bunk pocket includes an anti-wear insert therein to prevent wear of said stake positioned within said bunk pocket.

26. The apparatus for constraining a load according to claim 6, wherein said bunk pocket is integrally formed with said bunk as a one-piece unitary member.

* * * * *